United States Patent [19]  
Hattori et al.

[11] Patent Number: 4,547,560  
[45] Date of Patent: Oct. 15, 1985

[54] RANDOM STYRENE-BUTADIENE COPOLYMER RUBBER

[75] Inventors: Yasuo Hattori; Hideo Morita, both of Yokohama; Yoshihiro Inoki, Kawasaki, all of Japan

[73] Assignee: Asahi Kasei Kogyo Kabushiki Kaisha, Osaka, Japan

[21] Appl. No.: 474,733

[22] Filed: Mar. 18, 1983

Related U.S. Application Data

[63] Continuation of Ser. No. 329,368, Dec. 10, 1981, abandoned.

[30] Foreign Application Priority Data

Dec. 16, 1980 [JP] Japan .................. 55-177698

[51] Int. Cl.$^4$ .......................................... C08F 236/10
[52] U.S. Cl. ................................................ 526/340
[58] Field of Search ..................... 526/340; 524/575

[56] References Cited

U.S. PATENT DOCUMENTS

| | | |
|---|---|---|
| 2,975,160 | 3/1961 | Zelinski ................. 526/180 |
| 3,294,768 | 12/1966 | Wofford ............... 526/340 |
| 3,558,575 | 1/1971 | Keckler ................ 526/340 |
| 3,787,377 | 1/1974 | Halasa et al. ......... 526/340 |
| 3,903,019 | 9/1975 | Hargis et al. ......... 526/340 |
| 3,931,107 | 1/1976 | Trepka ................. 526/340 |
| 3,980,625 | 9/1976 | Sakamoto et al. ... 526/340 |
| 4,145,498 | 3/1979 | Farrar .................. 526/340 |
| 4,334,567 | 6/1982 | Bond .................... 526/340 |
| 4,387,756 | 6/1983 | Ogawa et al. ........ 526/340 |
| 4,387,757 | 6/1983 | Ogawa et al. ........ 526/340 |

FOREIGN PATENT DOCUMENTS 1446183 8/1976 United Kingdom .

OTHER PUBLICATIONS

Polymer, 1981, vol. 22, pp. 1721 through 1723.  
Rubber Chem. and Techn., 43, pp. 1138–1153 (1970).

Primary Examiner—Paul R. Michl  
Attorney, Agent, or Firm—Sprung Horn Kramer & Woods

[57] ABSTRACT

A random SBR having excellent tensile strength, resilience, and abrasion resistance as well as a reduced heat buildup property, which comprises 10% to 40% by weight of styrene units and the balance of butadiene units and has a Mooney viscosity of 30 to 150; a content of butadiene units having 1,2-vinyl structure of 60% or less; a ratio $\overline{Mw}/\overline{Mn}$ of from 1.2 to 3.5; and a content of isolated styrene units of 40% or more and a content of another styrene units in long chain block form of 5% or less, both contents being determined by decomposing the copolymer with ozone and by applying a gel permeation chromatographic analysis to the ozone decomposition product.

8 Claims, 1 Drawing Figure

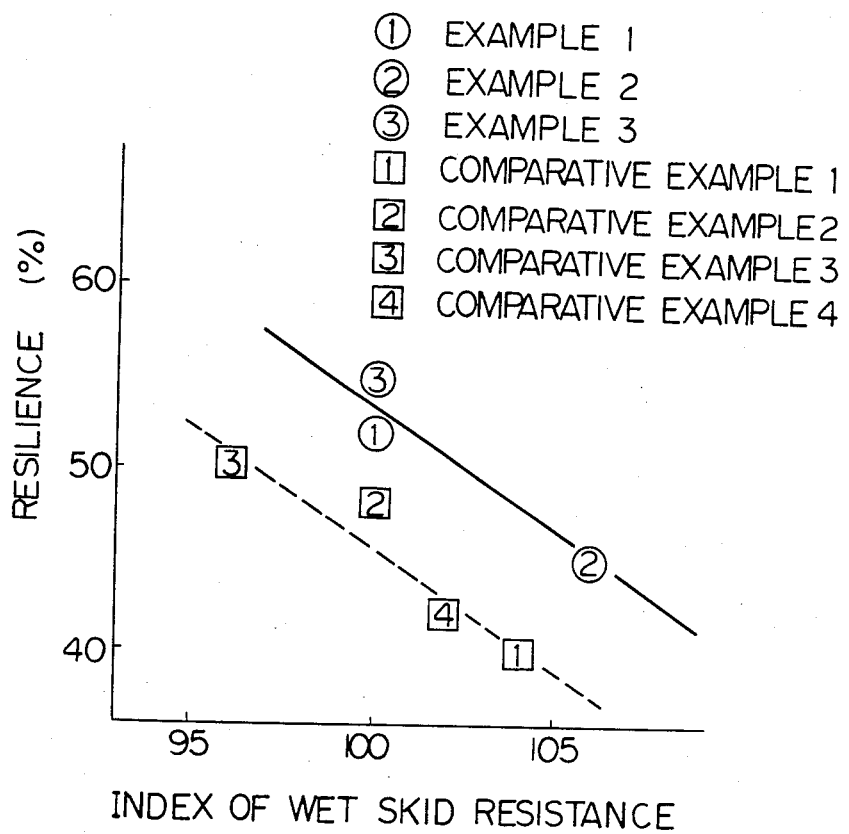

RANDOM STYRENE-BUTADIENE COPOLYMER RUBBER

This application is a continuation of application Ser. No. 329,368, filed Dec. 10, 1981, now abandoned.

FIELD OF THE INVENTION

The present invention relates to a random styrene-butadiene copolymer rubber, particularly, to a random styrene-butadiene copolymer rubber having excellent resilience, tensile strength, and resistance to abrasion and a reduced heat buildup property and being useful for tires.

BACKGROUND OF THE INVENTION

It is known that the solution polymerization process for producing a styrene-butadiene copolymer rubber by using a catalyst consisting of an organic lithium compound under usual conditions suffers from the disadvantage that the resultant copolymer molecule contains chain blocks consisting of a plurality of styrene units sequentially combined to each other. These styrene units are so-called block styrene.

In order to eliminate the above-mentioned disadvantage, various attempts were made to prepare a random styrene-butadiene copolymer.

In one attempt disclosed in U.S. Pat. No. 2,975,160, the copolymerization of styrene and butadiene was carried out in the presence of a polar organic solvent. In another attempt disclosed in U.S. Pat. No. 3,294,768, the copolymerization of styrene and butadiene was carried out in the presence of an organic salt or complex of sodium, potassium, or the like. In still another attempt, during the copolymerization procedure, one of the monomers to be copolymerized was added intermittently to the copolymerization mixture. In still another attempt, a copolymerization mixture was allowed to separate into a polymer phase and an inert diluent phase and the copolymerization was carried out under the separated phase condition.

The above-mentioned attempts resulted in decreasing the content of the block styrene units in the resultant copolymers. However, the resultant copolymers contained an increased amount of butadiene units having a 1,2-vinyl structure. Also, the modes of bonding of the styrene units and sequence distribution of the styrene units in the resultant copolymers, have not yet been clarified. That is, the copolymers obtained by the above-mentioned attempts should be distinguished from the random styrene-butadiene copolymer rubber of the present invention.

Recently, it has become possible to determine the sequence distribution of the styrene units in styrene-butadiene copolymer, by applying NMR spectrum analysis (Rubber Chemistry and Technology, 43, 1138 (1970)) to the copolymer. In this analysis, concrete concepts concerning a long chain block styrene segment and short chain block styrene segment were introduced into the chemistry of the styrene-butadiene copolymer. Also, it was attempted to provide a pseudorandom styrene-butadiene copolymer rubber and a method for producing the same. For example, British Pat. No. 1,446,183 and Japanese patent application Laid-Open No. 53-69288 (1978) disclose the above-mentioned attempt. However, it was unsatisfactory to quantitatively determine the amounts of the long and short chain block styrene segments by means of the NMR spectrum analysis using an analog computer. Also, it was impossible to determine the amount of isolated styrene units in the copolymer by means of the NMR spectrum analysis. Therefore, it was impossible to imagine the concept of random styrene-butadiene copolymer rubber.

Also, the conventional styrene-butadiene copolymer exhibited unsatisfactory resilience, tensile strength, resistance to abrasion, and heat buildup property.

SUMMARY OF THE INVENTION

An object of the present invention is to provide a random styrene-butadiene copolymer rubber having an excellent resilience, tensile strength, resistance to abrasion, and a reduced heat buildup property and useful for producing tires.

The random styrene-butadiene copolymer rubber of the present invention comprises 10% to 40% by weight of styrene units and the balance comprising butadiene units and has a Mooney viscosity of 30 to 150, which copolymer rubber is characterized in that the content of the butadiene units having a 1,2-vinyl structure is 60% or less based on the entire amount of the butadiene units in the copolymer; the heterogeneity index represented by the ratio of the weight average molecular weight $\overline{Mw}$ to the number average molecular weight $\overline{Mn}$ of the copolymer is in the range of from 1.2 to 3.5; the content of isolated styrene units and the content of styrene units in the form of long chain blocks are 40% or more and 5% or less, respectively, based on the entire weight of said styrene units in the copolymer, which contents have been determined by decomposing the copolymer with ozone and by subjecting the ozone-decomposition product to a gel permeation chromatographic analysis.

BRIEF DESCRIPTION OF THE DRAWING

The accompanying drawing is a graph showing a relationship between the resistance to wet skid and the resilience of rubber compositions containing styrene-butadiene copolymer rubbers.

DETAILED DESCRIPTION OF THE INVENTION

The random styrene-butadiene copolymer rubber of the present invention comprises 10% to 40% by weight, preferably, 15% to 30% by weight, of styrene units and the balance comprising butadiene unit. When the content of the styrene units is smaller than 10% by weight, the resultant copolymer rubber exhibits an unsatisfactory wet skid resistance. If the content of the styrene units is larger than 40%, the excessive amount of styrene units makes it difficult to obtain a satisfactory random copolymer, and the resultant copolymer exhibits physical properties unsatisfactory for rubber.

The random styrene-butadiene copolymer rubber of the present invention may contain, in addition to the styrene units and the butadiene units, a small amount, for example, 5% by weight or less, of additional monomeric units derived from at least one member selected from the group consisting of isoprene, dimethyl butadiene, pentadiene, methylstyrene, ethylstyrene, divinylbenzene, and diisopropenylbenzene.

The random styrene-butadiene copolymer rubber of the present invention has a Mooney viscosity of 30 to 150, preferably, 40 to 130, which has been determined at a temperature of 100° C. by using an L-type rotor. When the Mooney viscosity is less than 30, the resultant copolymer exhibits unsatisfactory physical properties, for example, poor elasticity and tensile strength. When the Mooney viscosity is more than 150, the resultant copolymer rubber exhibits a poor compatibility with various additives which are added to the copolymer rubber to provide a desired product, and an unsatisfactory processability, for example, poor extrudability.

In the random styrene-butadiene copolymer rubber of the present invention, the content of the butadiene units having a 1,2-vinyl structure is 60% or less, preferably 40% or less, more preferably 20% or less, based on the entire amount of the butadiene units in the copolymer.

When the content of the butadiene units having the 1,2-vinyl structure is more than 60%, the resultant copolymer exhibits a significantly reduced resilience and resistance to abrasion and the object of the present invention cannot be attained.

The random styrene-butadiene copolymer rubber of the present invention exhibits a distribution of molecular weight thereof, namely, a heterogeneity index, which is represented by the ratio of the weight average molecular weight $\overline{Mw}$ to the number average molecular weight $\overline{Mn}$, of 1.2 to 3.5, preferably 1.5 to 3.0. When the ratio $\overline{Mw}/\overline{Mn}$ is less than 1.2, the resultant copolymer rubber exhibits an unsatisfactory processability. Also, a ratio $\overline{Mw}/\overline{Mn}$ larger than 3.5 causes the resultant copolymer rubber to exhibit an unsatisfactory resilience and heat buildup property. As long as the value of the ratio $\overline{Mw}/\overline{Mn}$ is in the range of from 1.2 to 3.5, the distribution of molecular weight of the copolymer rubber is not limited to a specific mode of the distribution. That is, the mode of the distribution of molecular weight of the copolymer rubber may be monomodal, bimodal, or other multimodal.

It is preferable that the copolymer rubber of the present invention exhibit a bimodal distribution of molecular weight, which is obtained by coupling a portion of living ends in the polymerization terminals of the molecules of the copolymer rubber, with a coupling agent consisting of at least one polyfunctional compound selected from silicon tetrachloride, tin tetrachloride, tetrachloromethane, and chloroform.

In the random styrene-butadiene copolymer rubber of the present invention, the mode of bonding of the styrene units and the sequence distribution of the styrene units can be determined by decomposing the copolymer with ozone and, then, by subjecting the ozone-decomposition product to a gel permeation chromatographic analysis.

Hitherto, the sequence distribution of the styrene units in the copolymer were measured by means of $^1$H-NMR analysis or $^{13}$C-NMR analysis of the copolymer, or by applying a metathesis decomposition to the copolymer and then by applying a gas chromatographic analysis to the decomposition product. However, the above-mentioned analysis methods were not satisfactory to quantitatively determine the amount of isolated styrene units and to obtain the necessary information concerning the sequence of the styrene units in the copolymer from the results of the analyses.

In the present invention, the contents of the isolated styrene units and of the styrene units in the form of long chain block can be determined by the analytical method disclosed by Y. Tanaka et al in Polymer Preprints, Japan, Vol. 29, No. 9 (1980). In this analytical method, the copolymer is decomposed in such a manner that the entire amount of double bonds in the butadiene units are cut by the action of ozone, and the resultant decomposition product is subjected to the gel permeation chromatographic analysis In the results of the above-mentioned analytical method applied to the copolymer rubber of the present invention, it is necessary that the contents of the isolated styrene units which are separated from each other is 50% or more, preferably 65% or more, and that the content of the styrene units in the form of long chain blocks each consisting of 8 or more styrene units bound to each other is 5% or less, preferably 2.5% or less, based on the entire weight of the styrene units in the copolymer.

When the content of the isolated styrene units is less than 40% by weight and/or the content of the styrene units in the form of long chain blocks is more than 5% by weight, the resilience and abrasion resistance of the resultant random styrene-butadiene copolymer rubber are unsatisfactory in relation to the content of styrene units in the resultant copolymer.

The random styrene-butadiene copolymer rubber of the present invention can be prepared by the process in which a mixture of predetermined amounts of styrene, butadiene, and an inert diluent is continuously fed into a polymerization region in which the styrene and butadiene are copolymerized in the presence of a catalyst consisting of an organic lithium compound and a Lewis base at a temperature of 80° C. or more, preferably 90° C. or more, while the polymerization mixture is vigorously agitated.

In the above-mentioned method, it is preferable that a plurality of polymerization regions are connected to each other in series and the proportions of the amounts of styrene and butadiene supplied into the polymerization regions are the same as each other.

The organic lithium compound usable for the method for producing the random styrene-butadiene copolymer rubber of the present invention may be selected from the group consisting of methyl lithium; ethyl lithium; n-, sec- and tert-butyl lithium; amyl lithium; phenyl lithium; and cyclohexyl lithium.

The Lewis base may consist of at least one compound selected from the group consisting of ether compounds; thioether compounds; tert-amine compounds; phosphine compounds; alcoholates of alkali metals except for lithium; sulfonates; and sulfuric esters, for example, dimethyl ether, diethyl ether, diphenyl ether, tetrahydrofuran, dioxane, 1,2-dimethoxyethane, 1,2-dibutoxyethane, triethyl amine, N,N,N',N'-tetramethylethylenediamine, dialkylarylsulfides, hexamethylphosphoamide, potassium and sodium alkylbenzenesulfates, and potassium and sodium butoxides.

The mode of the sequence distribution of the styrene units in the copolymer is variable depending on the type and amount of the Lewis base contained in the catalyst. In order to produce the random styrene-butadiene copolymer rubber of the present invention, it is preferable that the Lewis base is selected from ethylene glycol dialkylethers and tert-diamines.

The amount of the Lewis base to be used is variable depending on the polymerization temperature and the intensity of the agitation of the polymerization mixture. The amount of the Lewis base consisting of an ethylene glycol dialkyl ether or a tert-diamine, is preferably in the range of from 0.3 to 20 parts by weight, more preferably from 0.5 to 5.0 parts by weight, per one part by weight of the organic lithium compound used in the catalyst.

The inert diluent usable for producing the random copolymer rubber of the present invention is not limited to a specific group of compounds, as long as the inert diluent does not deactivate the catalyst used. The inert diluent may consist of at least one compound selected from the group consisting of butane, pentane, hexane, heptane, octane, cyclohexane, and ethyl-cyclohexane. The most preferable compounds are hexane and cyclohexane.

The polymerization mixture containing styrene, butadiene, and the inert diluent may further contain an additional component consisting of at least one polymerizable monomer selected from allene compounds, for example, propane diene, 1,2-butane diene, 1,2-pentane diene, and 1,2-octane diene.

The temperature of the polymerization region should be maintained at a level of 80° C. or more, preferably 90° C. or more, more preferably from 90° C. to 180° C. When the polymerization temperature is below 80° C., the content of the styrene units in the form of undesirable long chain blocks becomes undesirably large, and, therefore, the resultant copolymer is not a satisfactory random copolymer. Also, a polymerization temperature less than 80° C. causes the productivity of the random styrene-butadiene copolymer rubber to be poor.

Also, it is important that the polymerization mixture is vigorously agitated in the polymerization region, especially, in the inlet portion of the polymerization region. The necessary efficiency of the agitating procedure has not yet been theoretically specified. However, it is preferable that in the inlet portion of the polymerization region, the value of a quotient of the value of the linear speed (m/sec) of the agitator with the value of the viscosity (poise) of the polymerization mixture in the polymerization region, is $1 \times 10^{-2}$ or more, more preferably $5 \times 10^{-2}$ or more. If the quotient is smaller than $1 \times 10^{-2}$, the resultant copolymer rubber contains an excessive amount of undesirable long chain blocks of the styrene units In the preparation of the random styrene-butadiene copolymer rubber of the present invention, it is preferable that the polymerization region is divided into two parts and the polymerization mixture is separately fed into the two parts of the polymerization region. In this case, it is also preferable that the portions of the polymerization mixture to be separately fed to the two parts of the polymerization region have the same composition as each other.

The above-mentioned method is significantly effective for producing completely random styrene-butadiene copolymer rubber of the present invention.

The random styrene-butadiene copolymer rubber of the present invention exhibits extremely excellent tensile strength, resilience and resistance to abrasion and a reduced heat buildup property. The above-mentioned superior properties make the random styrene-butadiene copolymer rubber of the present invention useful for producing the tread, carcass, and sidewalls of tires, extruded articles, window frames of cars, and other industrial materials. The random copolymer rubber of the present invention can be used in the form of a blend with a natural rubber and/or another synthetic rubber. Also, the random copolymer rubber of the present invention may be blended or grafted with various plastics so as to enhance the resistance to impact of the random copolymer rubber of the present invention or of the plastics. In this case, it is preferable that the content of the random styrene-butadiene copolymer rubber of the present invention in the blend is at least 30% by weight in order to utilize the excellent properties of the copolymer rubber of the present invention.

When the random copolymer rubber of the present invention is used blended with another rubber material, it is preferable that the another rubber material consist essentially of at least one member selected from natural rubber, styrene-butadiene copolymer rubbers which have been prepared by emulsion polymerization, styrene-butadiene copolymer rubbers which contain less than 35% of 1,2-vinyl structure, cis-1,4-polybutadiene rubber, 1,2-syndiotactic polybutadiene rubbers, polybutadiene rubbers containing 10% to 90% of 1,2-vinyl structure, and synthetic polyisoprene rubbers.

The random styrene-butadiene copolymer rubber of the present invention can be used in the form of a rubber composition which comprises at least 30% by weight of at least one random styrene-butadiene copolymer rubber of the present invention; and carbon black in an amount of 20 to 120 parts by weight per 100 parts by weight of the random copolymer rubber and a vulcanizing agent in a necessary amount for vulcanizing the random copolymer rubber. The grade and amount of the carbon black to be contained in the rubber composition is variable depending on the use of the rubber composition. Usually, the carbon black is selected from those of FEF grade, HAF grade, ISAF grade, GPF grade, and SAF grade. The amount of the carbon black is usually in a range of from 20 to 120 parts by weight per 100 parts by weight of the random copolymer rubber of the present invention. When the amount of the carbon black is below 20 parts by weight, the resultant composition imparts an unsatisfactory tensile strength and resistance to abrasion to the rubber product. Also, when the carbon black is used in an amount above 120 parts by weight, the resultant rubber product exhibits a significantly decreased resilience.

The vulcanizing agent usable for the rubber composition comprises preferably at least one compound selected from sulfur, quinone dioxime, dithiomorphorine, and alkylphenoldisulfides. The most preferable vulcanizing agent is sulfur. The amount of the vulcanizing agent is variable depending on the use of the rubber composition. For example, when sulfur is used as the vulcanizing agent, the usual sulfur amount used is 0.3 to 6.0 parts by weight per 100 parts by weight of the random copolymer rubber of the present invention.

The rubber composition may further contain an additive comprising at least one member selected from process oils, fillers, zinc oxide, stearic acid, antioxidants, ozone-degradation-preventing agents, and waxes. The process oil can be selected from conventional parafinic, naphthalenic, and aromatic process oils containing a high boiling point fraction in distilled petroleum, in consideration of the purpose and use of the rubber composition. The amount of the process oil is also variable depending on the use of the rubber composition.

The fillers may consist of at least one member selected from silica, silicates, calcium carbonate, titanium dioxide, and various clays.

The rubber composition can be prepared by mixing the component materials in a conventional mixing apparatus, for example, an open roll mixer or internal mixer. Also, the rubber composition can be vulcanized. Vulcanization of the rubber composition results in a product exhibiting physical properties, for example, resilience, resistance to abrasion, and heat buildup property superior to those of the conventional rubber composition.

Also, the rubber composition containing the random copolymer rubber of the present invention exhibits a superior resistance to wet skid and an excellent processability, for example, extrudability.

SPECIFIC EXAMPLES OF THE INVENTION

The present invention will be further illustrated by means of the following examples, which are only illustrated and not limitative thereof.

Examples 1 through 3 and Comparative Examples 1 through 3

In each of the Examples 1 through 3 and Comparative Examples 1 through 3, a 10 liter reactor equipped with an agitator, an inlet for introducing reaction ingredients thereinto, located in the bottom portion thereof, and an outlet for discharging the resultant reaction mixture therefrom, located in the top portion thereof, was charged with 5 liters of hot hexane having the temperature as indicated in Table 1. Next, a catalyst of the composition and amount indicated in Table 1 was introduced into the reactor through the inlet. Then, styrene at the feeding rate of 0.45 kg/hr, butadiene at the feeding rate of 1.35 kg/hr, and hexane at the feeding rate of 7.2 kg/hr were continuously introduced into the reactor through the inlet. The resultant copolymer solution was then discharged from the reactor through the outlet. Also, 2,4-di-tert-butyl-p-cresol was added, in an amount of 0.5 g per 100 g of the resultant copolymer, to the copolymer solution. The temperature of the polymerization region in the reactor is indicated in Table 1. In the polymerization region, the rotation number of the agitator was controlled so that the efficiency of agitation became $5.0 \times 10^{-2}$, except that in Comparative Example 2, the rotation number was reduced to 1/10 that in other examples.

The properties of the resultant styrene-butadiene copolymer rubber are indicated in Table 1.

Comparative Example 4

The same procedures as those described in Example 1 were carried out, except that the copolymerization, took place in a batch mode reaction without passing the reaction mixture through the reactor. The composition of the catalyst used and the temperature of the polymerization region were as indicated in Table 1. In this reaction, since the polymerization temperature was spontaneously, rapidly elevated up to 100° C., it was impossible to maintain the polymerization temperature at a constant level.

After the polymerization reaction was completed, the resultant copolymer solution was discharged from the bottom of the reactor by applying a nitrogen gas pressure onto the level surface of the copolymer solution. The copolymer solution was subjected to the same procedures as those described in Example 1. The properties of the resultant styrene-butadiene copolymer are shown in Table 1.

TABLE 1

| Item | Example 1 | Example 2 | Example 3 | Comparative Example 1 | Comparative Example 2 | Comparative Example 3 | Comparative Example 4 |
|---|---|---|---|---|---|---|---|
| Amount of butyl lithium (g/100 g of sum of styrene and butadiene used) | 0.06 | 0.06 | 0.06 | 0.065 | 0.06 | 0.06 | 0.075 |
| Type of Lewis base | Ethylene glycol dibutyl ether | Ethylene glycol dibutyl ether | Tetramethylene diamine | Ethylene glycol dibutyl ether | Tetramethylene diamine | None | Ethylene glycol dibutyl ether |
| Molar ratio of Lewis base to butyl lithium | 1 | 4 | 2 | 1 | 2 | 0 | 1 |
| Temperature of polymerization region (°C.) | 100 | 100 | 120 | 70 | 120 | 100 | 70 |
| Mooney viscosity | 57 | 55 | 53 | 50 | 54 | 60 | 52 |
| Entire content of styrene units (% wt)*[1] | 24.7 | 24.9 | 25.0 | 24.5 | 25.0 | 24.8 | 25.0 |
| Content of butadiene units having 1,2-vinyl structure (%)*[1] | 18 | 35 | 18 | 32 | 19 | 13 | 27 |
| Heterogeneity index ($\overline{M}w/\overline{M}n$)*[2] | 1.6 | 1.7 | 2.0 | 1.7 | 2.1 | 1.9 | 1.4 |
| Content of isolated styrene units (% wt)*[3] | 56 | 62 | 59 | 53 | 61 | 42 | 55 |
| Content of styrene units in long chain block form (% wt)*[3] | 2.3 | 0.2 | 0.1 | 7.3 | 6.4 | 38.1 | 19.7 |

Note:
*[1]This was determined by using an infrared spectrophotometer and in accordance with the Hampton's method. The value of the content is based on the entire amount of butadiene units.
*[2]This was determined by using a gel permeation chromatograph (Type LC-1) made by Shimazu Seisakusho, Japan and by using tetrahydrofuran as a mobile phase.
*[3]This was determined by the Tanaka et al method described hereinbefore.

In Table 1, a comparison of the random styrene-butadiene copolymer rubbers of the present invention prepared in Examples 1 through 4 with the conventional styrene-butadiene copolymers prepared in Comparative Examples 1 through 3 shows that the contents of the styrene units in the long chain block form of Examples 1 through 3 are remarkably smaller than those of Comparative Examples 1 through 4.

The resultant styrene-butadiene copolymer prepared in each of the Examples 1 through 3 and Comparative Examples 1 through 4 was converted into a rubber composition having the composition indicated in Table 2.

TABLE 2

| Component | Amount (parts by weight) |
|---|---|
| Styrene-butadiene copolymer | 100 |
| Aromatic process oil*[4] | 20 |
| HAF grade carbon black | 60 |
| Stearic acid | 2.2 |
| Zinc oxide | 5 |
| Antioxidant*[5] | 1.0 |
| Vulcanization-accelerater CZ*[6] | 1.2 |
| Sulfur | 1.8 |

Note:
*[4]This oil had a specific gravity of 0.951 and a VGC of 0.961
*[5]This was a reaction product of diphenyl amine with acetone
*[6]This consisted of N—cyclohexylbenzothiazol sulfeneamide The rubber composition was vulcanized at a temperature of 160° C. for 20 minutes. The properties of the resultant vulcanized rubber composition are indicated in Table 3.

TABLE 3

| Item | Example 1 | Example 2 | Example 3 | Comparative example 1 | Comparative example 2 | Comparative example 3 | Comparative example 4 |
|---|---|---|---|---|---|---|---|
| Hardness | 62 | 62 | 61 | 62 | 63 | 65 | 64 |
| 300% modulus (kg/cm$^2$)*[7] | 95 | 114 | 98 | 102 | 96 | 105 | 104 |
| Tensile strength (kg/cm$^2$)*[7] | 233 | 215 | 235 | 206 | 220 | 210 | 210 |
| Ultimate elongation (%)*[7] | 540 | 510 | 535 | 510 | 525 | 510 | 520 |
| Resilience (%)*[8] | 52 | 45 | 55 | 40 | 48 | 50 | 42 |
| Resistance to abrasion (index number)*[9] | 100 | 87 | 105 | 80 | 92 | 100 | 86 |
| Resistance to wet skid (index number)*[10] | 100 | 106 | 100 | 104 | 100 | 96 | 102 |
| Goodrich heat buildup (°C.)*[11] | 25 | 24 | 22 | 27 | 29 | 37 | 35 |

Note:
*[7]This was determined in accordance with the method of JIS (Japan Industrial Standard) K-6310
*[8]This was determined at room temperature by using a Dunlop tripsometer
*[9]This was determined by using a Pico abrasion tester. The abrasion resistance of the rubber composition of Example 1 was represented by an abrasion resistance index number of 100 and the abrasion resistances of other examples and the comparative examples were represented by relative index numbers to that of Example 1.
*[10]This was determined by using the tester in the British National Road Institute and represented by relative index number to the wet skid resistance of the composition of Example 1 which had an index number of 100.
*[11]This was determined at a temperature of 50° C. in accordance with ASTM D-813-59.

The resiliences and the resistances to wet skid of the rubber compositions of Examples 1 through 3 and Comparative Examples 1 through 4 are indicated in the accompanying drawing.

In view of Table 3, it is clear that the rubber compositions of the Examples 1 through 3 exhibited a smaller heat buildup property than that of Comparative Examples 1 through 4.

In the accompanying drawing, it is clarified that the line indicating the relationship between the resilience and the wet skid resistance of the rubber compositions of the present invention is located remarkably above that of the comparative rubber compositions.

Furthermore, during the preparation procedures of the vulcanized rubber compositions of Examples 1 through 3, it was found that the random styrene-butadiene copolymer rubber of the present invention exhibited a good processability which was not inferior to that of conventional copolymer rubbers.

Example 4 and Comparative Examples 5 and 6

In both Example 4 and Comparative Example 5, the same procedures as those described in Example 1 were carried out, except that the composition of the catalyst used and the temperature of the polymerization region were as indicated in Table 4. The properties of the resultant copolymer are indicated in Table 4.

In Comparative Example 6, the same procedures as those described in Example 1 were carried out, except that the composition of the catalyst used was as indicated in Table 4 and the reactor was in the form of a tube having a capacity thereof of 10 liters and a ratio of the diameter to the length thereof of 1/16. The properties of the resultant copolymer are also indicated in Table 4.

TABLE 4

| Item | Example No. 4 | Comparative Example No. 5 | Comparative Example No. 6 |
|---|---|---|---|
| Amount of butyl lithium (g/100 g of the sum of styrene and butadiene used) | 0.06 | 0.06 | 0.065 |
| Type of Lewis base | Potassium nonyl phenoxide | Potassium nonyl phenoxide | Potassium nonyl phenoxide |
| Molar ratio of Lewis base to butyl lithium | 1/20 | 1/20 | 1/20 |
| Temperature of polymerization region (°C.) | 120 | 70 | 100 |
| Mooney viscosity | 48 | 47 | 58 |
| Entire amount of styrene units (% wt) | 23.2 | 22.6 | 23.3 |
| Amount of butadiene units having 1,2-vinyl structure (%) | 15 | 18 | 18 |
| Heterogeneity index (Mw/Mn) | 2.7 | 2.2 | 1.9 |
| Amount of isolated styrene units (% wt) | 43 | 35 | 38 |
| Amount of styrene units in long chain block form (% wt) | 3.7 | 12.0 | 13.6 |

In view of Table 4, it is realized that the Lewis base containing potassium causes the amount of the isolated styrene units contained in the resultant copolymer to be relatively small in comparison with that of Examples 1 through 3.

In each of the Example 4 and Comparative Examples 5 and 6, the resultant copolymer was converted into a rubber composition in the same manner as that described in Example 1, and the rubber composition vulcanized at a temperature of 160° C. for 20 minutes. The properties of the vulcanized rubber composition are shown in Table 5.

TABLE 5

| Item | Example No. 4 | Comparison Example No. 5 | Comparison Example No. 6 |
|---|---|---|---|
| Hardness | 62 | 62 | 63 |
| 300% modulus (kg/cm$^2$) | 103 | 97 | 99 |
| Tensile strength (kg/cm$^2$) | 221 | 215 | 216 |
| Ultimate elongation (%) | 535 | 515 | 530 |
| Resilience (%) | 50 | 48 | 47 |
| Resistance to abrasion (Index) | 97 | 97 | 92 |
| Resistance to wet skid (Index) | 96 | 96 | 100 |
| Goodrich heat buildup (%) | 30 | 37 | 33 |

A comparison of Table 5 and Table 3 shows that a relatively small content of isolated styrene units in the copolymer causes the resultant copolymer to contain a relatively large amount of the styrene units in the long chain block form and causes the resultant vulcanized rubber composition to exhibit a relatively large heat buildup property and relatively small resilience and wet skid resistance.

Examples 5 through 8 and Comparative Examples 7 and 8

In Examples 5 through 7 and Comparative Examples 7 and 8, the same procedures as those described in Example 1 were carried out, except that the reactor used was provided with an additional inlet for introducing the reaction ingredients, located in the middle portion of the reactor; styrene, butadiene and hexane were introduced respectively, in feeding rates of 0.33 kg/hr, 1.50 kg/hr and 7.2 kg/hr, into the reactor through the inlet and the addition inlet; the feeding rate of each feed fed through the additional inlet was ⅓ of the entire feeding rate thereof; and the composition of the catalyst used and the temperature of the polymerization region were as indicated in Table 6.

In Example 8, the same procedures as those described in Example 3 were carried out, except that the resultant copolymer solution was mixed with tin tetrachloride in an amount of 0.15 times the molar amount of the butyl lithium.

The properties of the copolymers of Examples 5 through 8 and Comparative Examples 7 and 8 are indicated in Table 6.

In each of the Examples 5 through 8 and Comparative Examples 7 and 8, the resultant copolymer was converted into a rubber composition in the same manner as that described in Example 1, and the rubber composition was vulcanized at a temperature of 160° C. for 20 minutes.

The properties of the vulcanized rubber composition are indicated in Table 7.

TABLE 7-continued

| | Example No. | | | | Comparative Example No. | |
|---|---|---|---|---|---|---|
| Item | 5 | 6 | 7 | 8 | 7 | 8 |
| Resistance to abrasion (Index) | 117 | 112 | 108 | 106 | 103 | 120 |
| Resistance to wet skid (Index) | 95 | 99 | 98 | 99 | 97 | 95 |
| Goodrich heat buildup | 21 | 20 | 29 | 20 | 26 | 34 |

Examples 9 through 11 and Comparative Examples 9 through 11

In Examples 9, 10, and 11 and Comparative Examples 9 and 11, the same procedures as those described in Example 1 were carried out, except that the ratio of the feeding rate of styrene to that of butadiene was varied so that the resultant copolymer contained the entire amount of styrene units indicated in Table 8, and, the composition of the catalyst used and the temperature of the polymerization region were as indicated in Table 8, and except that in Comparative Example 11, divinyl henzene was introduced in an amount of 0.02 g per 100 g of the sum of the amounts of styrene and butadiene into the reacter.

In Comparative Example 10, the same batchwise procedures as those described in Comparative Example 4 were carried out, except that the composition of the catalyst used and the temperature of the polymerization region were as shown in Table 8.

The properties of the resultant copolymers of the examples and comparative examples are indicated in Table 8.

In each of the Examples 9 through 11 and Comparative Examples 9 through 11, the copolymer was converted into a vulcanized rubber composition in the same manner as that described in Example 1, except that the composition of the rubber composition was as indicated in Table 9.

The properties of the resultant vulcanized rubber compositions of Examples 9 through 11 and Comparative Examples 9 through 11 are indicated in Table 10.

TABLE 6

| | Example No. | | | | Comparative Example No. | |
|---|---|---|---|---|---|---|
| Item | 5 | 6 | 7 | 8 | 7 | 8 |
| Amount of butyl lithium (g/100 g of sum of styrene and butadiene) | 0.04 | 0.04 | 0.04 | 0.06 | 0.04 | 0.03 |
| Type of Lewis base | Ethylene glycol dibutyl ether | Tetra-methylene diamine | Potassium nonyl phenoxide | Tetra-methylene diamine | None | Tetra-methylene diamine |
| Molar ratio of Lewis base to butyl lithium | 4 | 2 | ¼ | 2 | 0 | 2 |
| Temperature of polymerization region (°C.) | 130 | 130 | 130 | 120 | 130 | 130 |
| Mooney viscosity | 88 | 91 | 85 | 92 | 95 | 160 |
| Entire amount of styrene units (% wt) | 25.0 | 25.0 | 24.1 | 25.0 | 25.0 | 24.2 |
| Amount of butadiene units having 1,2-vinyl structure (% wt) | 16 | 19 | 17 | 18 | 13 | 20 |
| Heterogeneity index ($\overline{M}w/\overline{M}n$) | 2.4 | 2.0 | 3.2 | 2.8 | 2.3 | 2.0 |
| Amount of isolated styrene units (% wt) | 68 | 70 | 44 | 59 | 64 | 70 |
| Amount of styrene units in long chain block form (% wt) | 0.1 or less | 0.1 or less | 3.4 | 0.1 | 8.2 | 0.1 or less |

TABLE 7

| | Example No. | | | | Comparative Example No. | |
|---|---|---|---|---|---|---|
| Item | 5 | 6 | 7 | 8 | 7 | 8 |
| Hardness | 63 | 64 | 63 | 62 | 64 | 64 |
| 300% modulus (kg/cm$^2$) | 117 | 115 | 109 | 120 | 111 | 115 |
| Tensile strength (kg/cm$^2$) | 246 | 244 | 239 | 243 | 227 | 200 |
| Ultimate elongation (%) | 530 | 525 | 520 | 540 | 510 | 460 |
| Resilience (%) | 59 | 60 | 57 | 60 | 53 | 62 |

TABLE 8

| Item | Example No. 9 | Example No. 10 | Example No. 11 | Comparative Example No. 9 | Comparative Example No. 10 | Comparative Example No. 11 |
|---|---|---|---|---|---|---|
| Amount of butyl lithium (g/100 g of the sum of styrene and butadiene) | 0.6 | 0.6 | 0.6 | 0.6 | 0.6 | 0.8 |
| Type of Lewis base | Ethylene glycol dibutyl ether | Ethylene glycol dibutyl ether | Ethylene glycol dibutyl ether | Ethylene glycol dibutyl ether | Ethylene glycol dibutyl ether | Ethylene glycol dibutyl ether |
| Molar ratio of Lewis base to butyl lithium | 2 | 4 | 6 | 6 | 10 | 1 |
| Temperature of polymerization region (°C.) | 100 | 100 | 100 | 100 | 100 | 100 |
| Mooney viscosity | 55 | 50 | 48 | 51 | 44 | 57 |
| Entire amount of styrene units (% wt) | 15 | 18 | 12 | 5 | 18 | 25 |
| Amount of butadiene units having 1,2-vinyl structure (%) | 26 | 36 | 48 | 48 | 64 | 18 |
| Heterogeneity index ($\overline{M_w}/\overline{M_n}$) | 1.7 | 1.8 | 2.1 | 2.0 | 1.4 | 4.1 |
| Amount of isolated styrene units (% wt) | 65 | 62 | 71 | 80 | 63 | 60 |
| Amount of styrene units in long chain block form (% wt) | 1.0 | 0.2 | 0.1 or less | 0.1 or less | 3.4 | 2.2 |

TABLE 9

| Component | Amount (part by weight) |
|---|---|
| Styrene-butadiene copolymer rubber | 100 |
| Aromatic process oil | 10 |
| HAF grade carbon black | 50 |
| Stearic acid | 2 |
| Zinc oxide | 5 |
| Antioxidant B | 1 |
| Vulcanization accelerater CZ | 1.2 |
| Sulfur | 1.8 |

TABLE 10

| Item | Example No. 9 | Example No. 10 | Example No. 11 | Comparative Example No. 9 | Comparative Example No. 10 | Comparative Example No. 11 |
|---|---|---|---|---|---|---|
| Hardness | 60 | 59 | 60 | 58 | 61 | 60 |
| 300% modulus (kg/cm$^2$) | 108 | 110 | 104 | 100 | 114 | 120 |
| Tensile strength (kg/cm$^2$) | 232 | 238 | 235 | 220 | 213 | 220 |
| Ultimate elongation (%) | 450 | 460 | 440 | 400 | 440 | 460 |
| Resilience (%) | 60 | 54 | 52 | 55 | 46 | 52 |
| Resistance to abrasion (Index) | 100 | 96 | 91 | 80 | 62 | 66 |
| Resistance to wet skid (Index) | 100 | 102 | 103 | 101 | 104 | 102 |
| Goodrich heat buildup | 20 | 18 | 16 | 16 | 17 | 24 |

In view of Tables 8 and 9, in Comparative Example 8 in which the resultant copolymer had an entire content of styrene units less than 10% by weight, in Comparative Example 9 wherein the resultant copolymer had an amount of the butadiene units having the 1,2-vinyl structure more than 60%, and in Comparative Example 10 wherein the $\overline{M_w}/\overline{M_n}$ of the resultant copolymer was more than 3.5, the resultant vulcanized rubber compositions exhibited a relatively low tensile strength and a poor resistance to abrasion, in spite of the fact that the sequence distributions of the styrene units in the copolymers of the above-mentioned comparative examples fall within the scope of the present invention.

Examples 12 through 15 and Comparative Examples 12 through 15

In each of the Examples 12 through 15 and Comparative Examples 12 through 15, a rubber blend was prepared from the copolymer rubber prepared in Example 3 and a styrene-butadiene copolymer rubber was prepared by means of an emulsion polymerization which was available in the trademark of JSR SBR #1502 from Japan Synthetic Rubber Co., a polybutadiene rubber which was available under the trademark of Nippol 1220, from Nippon Zeon Co., or a natural rubber of the RSS #3 grade, in the composition indicated in Table II.

The rubber blend or rubber was converted into a vulcanized rubber composition in the same manner as that described in Example 1.

The properties of the vulcanized rubber composition are indicated in Table II.

TABLE 11

| | Item | Example No. 12 | Example No. 13 | Example No. 14 | Example No. 15 | Comparative Example No. 12 | Comparative Example No. 13 | Comparative Example No. 14 | Comparative Example No. 15 |
|---|---|---|---|---|---|---|---|---|---|
| Composition of rubber blend | Random styrene butadiene copolymer rubber prepared in Example 3 | 60 | 40 | 60 | 60 | | | | 20 |
| | SBR prepared by emulsion polymerization method | 40 | 60 | | | 100 | | | 80 |
| | Polybutadiene rubber | | | 40 | | | 100 | | |
| | Natural rubber | | | | 40 | | | 100 | |
| Property of vulcanized rubber composition | Hardness | 62 | 62 | 61 | 61 | 63 | 60 | 59 | 62 |
| | 300% modulus (kg/cm$^2$) | 120 | 122 | 115 | 118 | 138 | 115 | 120 | 126 |
| | Tensile strength (kg/cm$^2$) | 231 | 236 | 217 | 248 | 245 | 200 | 263 | 242 |
| | Ultimate elongation (%) | 470 | 470 | 480 | 500 | 450 | 420 | 520 | 465 |
| | Resilience (%) | 55 | 54 | 57 | 57 | 50 | 58 | 58 | 52 |
| | Resistance to abrasion (Index) | 102 | 102 | 142 | 100 | 100 | 210 | 95 | 101 |
| | Resistance to wet skid (Index) | 100 | 100 | 90 | 96 | 100 | 70 | 81 | 100 |
| | Goodrich heat buildup (°C.) | 23 | 28 | 24 | 22 | 38 | 28 | 25 | 33 |

Table II indicates that when the random styrene-butadiene copolymer rubber is blended in an amount of 30% by weight or more with another rubber material, the resultant rubber compositions exhibit satisfactory properties including hardness, tensile stress, tensile strength, ultimate elongation, resilience, abrasion resistance, wet skid resistance, and heat buildup.

We claim:

1. A random styrene-butadiene copolymer rubber, comprising 10% to 40% by weight of styrene units and the balance comprising butadiene units and having a Mooney viscosity of 30 to 150, which copolymer rubber is characterized in that the content of the butadiene units having a 1,2-vinyl structure is from 16 to 48% based on the entire amount of said butadiene units in said copolymer; the heterogeneity index represented by the ratio of the weight average molecular weight $\overline{Mw}$ to number average molecular weight $\overline{Mn}$ of said copolymer is in the range of from 1.5 to 3.0; the content of the isolated sytene units and the content of the styrene units in the form of long chain blocks of at least 8 styrene units are 50% or more and 5% or less, respectively, based on the entire weight of said styrene units in said copolymer, which contents have been determined by decomposing said copolymer with ozone and by subjecting said ozone-decomposition product to a gel permeation chromatographic analysis.

2. A copolymer rubber as claimed in claim 1, wherein said copolymer rubber has been prepared by a solution polymerization method.

3. A copolymer rubber as claimed in claim 1, wherein the content of said styrene units in the form of long chain blocks is 2.5% or less based on the entire weight of said styrene units in said copolymer.

4. A copolymer rubber as claimed in claim 1, wherein the content of said styrene units in said copolymer is in the range of from 15% to 30% by weight.

5. A copolymer rubber as claimed in claim 1, wherein the content of butadiene units having said 1,2-vinyl structure from 16 to 40%.

6. A rubber composition containing a random styrene-butadiene copolymer rubber as claimed in claim 1.

7. A rubber composition as claimed in claim 6, wherein the amount of said random styrene-butadiene copolymer rubber is at least 30% by weight.

8. A rubber composition as claimed in claim 7, which composition further comprises carbon black in an amount of 20 to 120 parts by weight per 100 parts by weight of said copolymer rubber and a vulcanizing agent in a necessary amount for vulcanizing said copolymer rubber.

* * * * *